US012552220B1

(12) United States Patent
Kosbau et al.

(10) Patent No.: US 12,552,220 B1
(45) Date of Patent: Feb. 17, 2026

(54) THERMAL MANAGEMENT UNIT FOR AN ELECTRIC VEHICLE

(71) Applicant: Endera Corporation, Casper, WY (US)

(72) Inventors: Thomas Kosbau, Brooklyn, NY (US); Alfredo Gonzalez, Corona, CA (US); Enrique Garcia, San Gabriel, CA (US); Shashvat Mehta, San Gabriel, CA (US); John Joseph Walsh, Casper, WY (US); Kuldip Bawankule, Dighori Mothi Maharshantra (IN)

(73) Assignee: Endera Corporation, Casper, WY (US)

( * ) Notice: Subject to any disclaimer, the term of this patent is extended or adjusted under 35 U.S.C. 154(b) by 500 days.

(21) Appl. No.: 17/973,015

(22) Filed: Oct. 25, 2022

Related U.S. Application Data

(60) Provisional application No. 63/271,592, filed on Oct. 25, 2021.

(51) Int. Cl.
*B60H 1/00* (2006.01)
*B60L 58/26* (2019.01)

(52) U.S. Cl.
CPC .......... *B60H 1/00278* (2013.01); *B60L 58/26* (2019.02); *B60H 2001/00171* (2013.01); *B60H 2001/00307* (2013.01)

(58) Field of Classification Search
CPC .......................... B60H 1/00278; B60L 58/26
See application file for complete search history.

(56) References Cited

U.S. PATENT DOCUMENTS

| | | | | |
|---|---|---|---|---|
| 4,007,315 | A * | 2/1977 | Brinkmann | H01M 10/653 |
| | | | | 429/62 |
| 4,643,134 | A * | 2/1987 | Schnizlein | F01P 11/0285 |
| | | | | 123/41.1 |
| 9,673,492 | B2 * | 6/2017 | Nemesh | H01M 10/625 |
| 10,557,401 | B2 * | 2/2020 | Bilancia | F01P 7/167 |
| 2011/0189511 | A1 * | 8/2011 | Yoon | H01M 10/486 |
| | | | | 429/50 |
| 2013/0327511 | A1 * | 12/2013 | Johnston | F28F 9/02 |
| | | | | 165/173 |
| 2015/0101549 | A1 * | 4/2015 | Bilancia | F02F 1/243 |
| | | | | 123/41.31 |
| 2019/0077275 | A1 * | 3/2019 | Capati | H01M 10/63 |

* cited by examiner

Primary Examiner — Lionel Nouketcha
(74) Attorney, Agent, or Firm — Rutan & Tucker, LLP

(57) ABSTRACT

Embodiments of the invention are directed to a thermal management unit implemented within an electric vehicle including a plurality of battery packs. The thermal management unit features a first manifold operating as a coolant convergence device and a second manifold operating as a coolant divergence device. Alternatively, the thermal management unit may include a base plate, which is adapted to maintain a coolant convergence devices and a coolant divergence device.

18 Claims, 12 Drawing Sheets

THERMAL MANAGEMENT UNIT FOR AN ELECTRIC VEHICLE

CROSS-REFERENCE TO RELATED APPLICATIONS

This application claims the benefit of priority on U.S. Provisional Application No. 63/271,592 filed Oct. 25, 2021, the entire contents of which are incorporated by reference herein

FIELD

Embodiments of the disclosure relate to the field of thermal management within a vehicle, and more specifically, a thermal base plate and/or a manifold relied upon for coolant flow management.

GENERAL BACKGROUND

Public transportation provides many benefits to individuals, communities, and the local economy. For decades, it has been widely recognized that public transportation can reduce air pollution and traffic congestion that have plagued our cities, especially in high density areas. With advancements in battery technologies over the last few years, the electrification of public transportation and other mass transportation (mass-transit) services is ascertainable. The usage of mass-transit electric vehicles would assist us in making larger strides to reduce carbon-monoxide (CO) emissions, a contributing factor in global climate change. But, to achieve consumer acceptance, mass-transit electric vehicles have to overcome a number of challenges.

One of these challenges is that mass-transit vehicles will need to deploy multiple battery packs that heavily rely on its thermal systems. These thermal systems need to be extremely efficient in order to avoid redundant or excessive components that unnecessarily add weight to the electric vehicle. Given that weight reduction is highly correlated to increased driving distance and driving duration for an electric vehicle, efforts are needed to minimize unnecessary hoses and tubing to improve overall performance of an electric, mass-transit vehicle.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
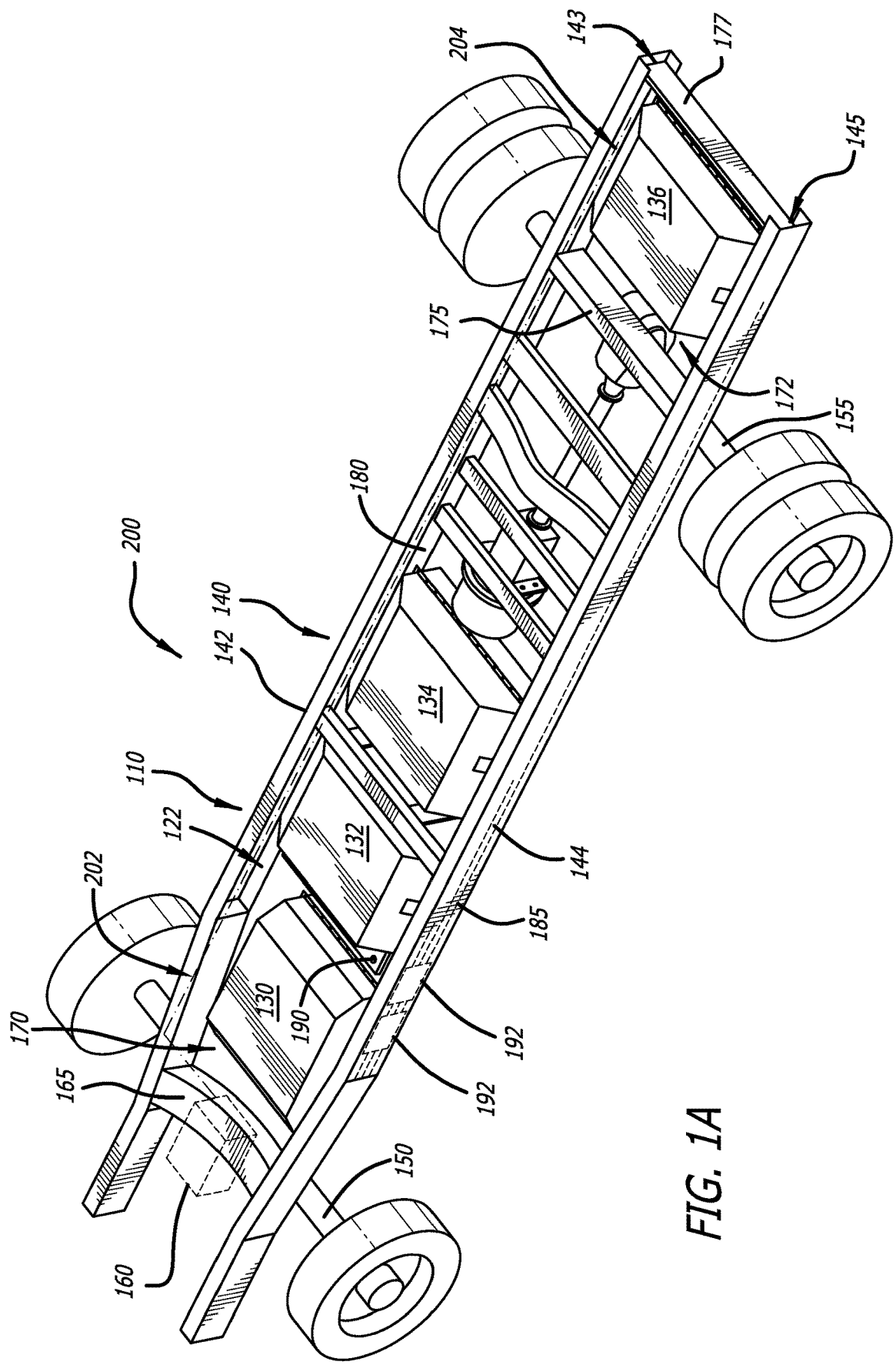
FIG. 1A is a perspective view of an exemplary embodiment of a chassis for an electric vehicle deploying a high-voltage (HV) battery pack system.

According to one embodiment of the disclosure, thermal system architectures for an electric vehicle, which features a thermal management unit (e.g., thermal plate and/or one or more manifolds, etc.), are described. In particular, one embodiment of the thermal management unit may feature a thermal base plate, which is configured to route the flow of coolant throughout an electric vehicle. The thermal base plate includes a coolant convergence device, a coolant divergence device, connection areas for a chiller and a heater for attachment to the thermal plate, and a cut-out for conduits to provide coolant between vehicle components. Another embodiment of the thermal management unit may include one or more manifolds, which operate to divert and converge coolant delivered through thermal conduits.

More specifically, according to one embodiment of the disclosure, an incoming flow of coolant from high-voltage (HV) battery packs is received by the coolant convergence device of the thermal base plate. The coolant convergence device features an inlet that is configured to (i) receive coolant from at least four HV battery pack coolant lines and (ii) subsequently combine and propagate the received coolant via a first conduit to a selected component of the vehicle's thermal system such as a drive inverter. The coolant is routed from the drive inverter via a second conduit, which is configured to pass through the cut-out within the thermal base plate to the centralized, electrical control system. The cut-out is sized to receive a third conduit from a pump for propagation to the chiller.

As needed, the chiller is configured to decrease the temperature of the coolant received from the pump and route the thermally-adjusted coolant to a positive temperature coefficient (PTC) heater. The PTC heater may re-route the coolant to the coolant divergence device with applying any thermal change to the coolant or may apply heat to increase the temperature of the coolant. Both the chiller and the PTC heater are controlled to place the temperature of the coolant into a selected temperature range before supplying the coolant to the HV battery packs via the coolant divergence device. The coolant divergence device features an inlet that divides the coolant from the PTC heater into a prescribed number of coolant flows, which are propagated via battery pack coolant lines for dissemination to and thermal management of the HV battery packs.

According to another embodiment of the disclosure, an incoming flow of coolant from high-voltage (HV) battery packs is received by one or more manifolds (referred to as "manifold(s)"). Operating as a coolant divergence device, the first manifold may be configured as an inlet manifold to (i) receive incoming coolant and (ii) route the incoming coolant to components positioned within the chassis of the electric vehicle, such as one or more battery packs, inverter, DC-DC power supply, one or more chargers, or the like. Operating as a coolant convergence device, a second manifold may be used as an outlet manifold to (i) receive coolant from return coolant lines and (ii) subsequently combine and propagate the received coolant as part of the feedback loop to a chiller component.

I. Terminology

In the following description, certain terminology is used to describe aspects of the invention. In certain situations, the term "member" is a general representation of a mechanical structure and the term "vehicle component" is representative of one or more electrical, mechanical, or electro-mechanical devices involved in the operability of an electric vehicle such as a mass-transit electric vehicle. Examples of a vehicle component may include, but are not limited or restricted to an electric motor, gearbox, power converter, high-voltage (HV) battery pack, charger, chiller, PTC heater, pump, condenser, or the like.

A "vehicle" generally refers to a multi-passenger conveyance such as an automotive conveyance, inclusive of a mass-transit electric vehicle (e.g., shuttle, bus, parcel van, limousine, etc.), an airplane, a train, or the like. According to one embodiment, the automotive conveyance may be a low-emission, plug-in electric vehicle such as an electric shuttle, electric bus, or other type of electric vehicle. However, it is contemplated that the electric vehicle may include an internal combustion engine to operate in concert with an electric motor.

A "chassis" generally refers to the main support structure of a vehicle to which other components are attached. Herein, the chassis includes a pair of frame rails and one or more cross members. Each "frame rail" is a component of a vehicle chassis that extends longitudinally along a driver-side or passenger-side of the vehicle exceeding in length a distance from the vehicle's front axle to a vehicle's back axle. A "cross member" generally refers to a component arranged for extending between and coupling to the pair of frame rails forming the vehicle chassis. Collectively, the frame rails and the cross member(s) form an integral part of the chassis.

The term "coolant" may constitute a fluid, air, or other gaseous mixture utilized to apply or remove heat from a vehicle component. The coolant may be propagated through a "conduit," namely a hose, tubing, piping or another coolant conveyance structure. The term "signal" generally refers to a transmission of data in digital form, data in analog form, or pulse-width modulation (PWM) data. The signal may be transmitted over a wired or wireless communication medium.

The term "computerized" generally represents that any corresponding operations are conducted by hardware in combination with software and/or firmware. The term "concurrently" generally represents two operations being performed at least partially overlapping in time.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Electric Vehicle Infrastructure

Referring to FIG. 1A, a perspective view of an exemplary embodiment of a chassis 110 of an electric vehicle 100 deploying a multiple high-voltage (HV) battery pack system 120 (hereinafter, "battery pack system") is shown. As shown, the battery pack system 120 may be implemented as a four-battery pack system with all of the HV battery packs 130, 132, 134 and 136 deployed between frame rails 140 of the chassis 110, which extends beyond a front axle 150 and a back axle 155. An electrical control system 160, whose temperature may be regulated by the vehicle's thermal system (described below) that controls coolant distribution throughout the electric vehicle 100, is positioned on the chassis 110 such as positioned on a cradle 165 situated above the front axle 150.

Herein, the battery pack system 120 includes a first HV battery pack subsystem 122, which includes three HV battery packs 130, 132, and 134. Herein, the first battery pack subsystem 122 is installed within a first installation area 170 defined by a first frame rail 142, a second frame rail 144, the cradle 165 (or a front axle 150) and a first cross member 175 (or the rear axle 155). The battery pack system 120 further includes a second battery pack subsystem 124, which includes a fourth HV battery pack 136 installed within a second installation area 172 defined by the first frame rail 142, the second frame rail 144, the first cross member 175, and a second cross member 177. All of these HV battery packs 130, 132, 134 and 136 are secured to the chassis 110 through mounting brackets (not shown) that are correspondingly coupled to both the HV battery packs 130, 132, 134 and 136 as well as the first and second frame rails 142 and 144.

As shown in FIG. 1A, the first frame rail 142 is constructed to create a channel 143 configured to retain one or more high-voltage power interconnects 180 for the transmission of voltage and amperage to and from the HV battery packs 130, 132, 134 and 136. Similarly, the second frame rail 144 is constructed to create a channel 145 configured to retain another type of interconnect, namely one or more conduits 185 that enable the conveyance of coolant throughout the electric vehicle 100 to alter or maintain the operating temperature of components deployed within the chassis 110 with a prescribed temperature range in efforts to optimize performance of such components. As an alternative embodiment, as illustrated in FIGS. 6A-8E as described below, one or more thermal manifolds 192 may be positioned within the channel 145 and/or coupled to the second frame rail 144 in order to assist in divergence and convergence of coolant among components deployed within the electric vehicle 100. These components may include, but are not limited or restricted to HV battery packs, inverters, chargers, power converters or other components involved in electrification of a vehicle and/or the storage or delivery of electrical power.

Figure 1B:
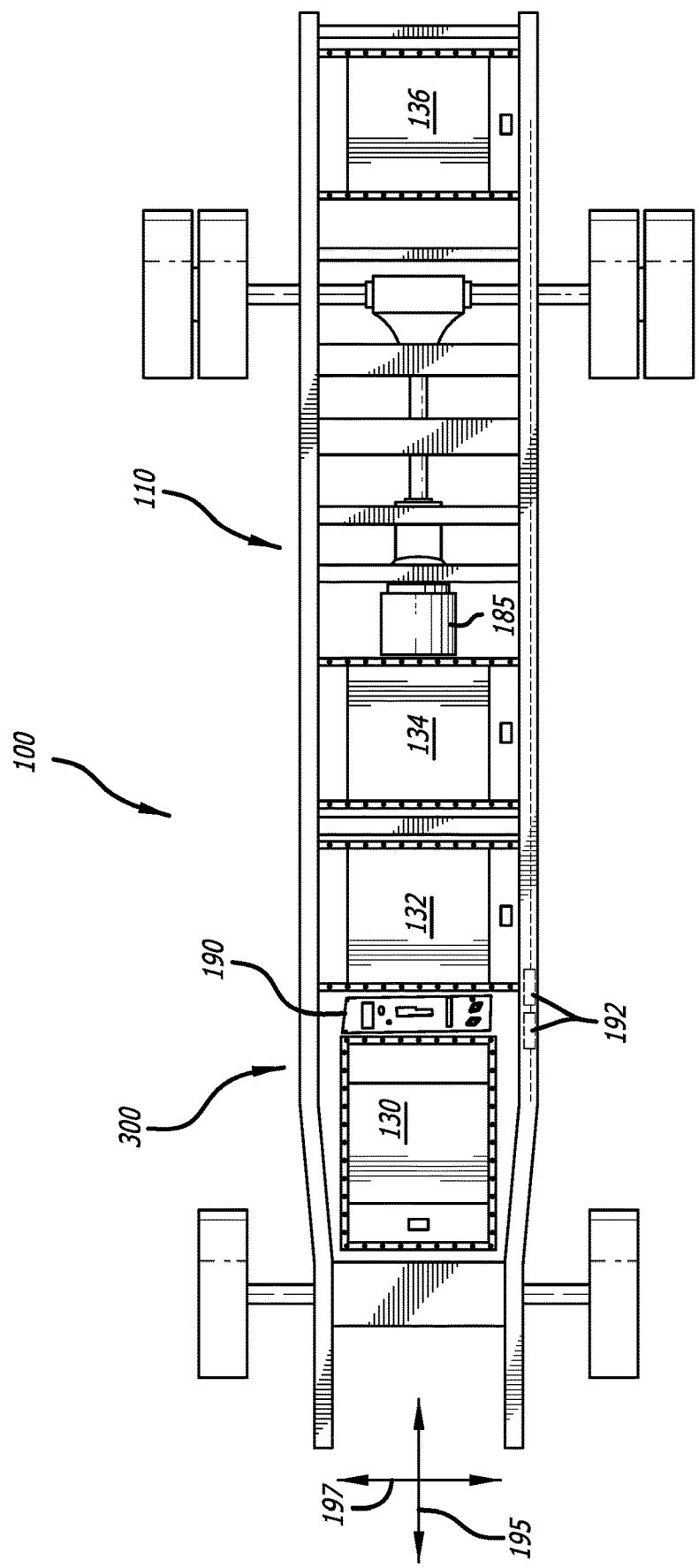
FIG. 1B is a plan view of an exemplary embodiment of the chassis of FIG. 1A identifying a location of a thermal management unit in the form of a thermal base plate.

Referring now to FIGS. 1A-1B, a thermal management unit 190, implemented as a thermal base plate, is positioned between the first HV battery pack 130 and the second HV battery pack 132. More specifically, each of the HV battery packs 130, 132, 134 and 136 is positioned in a selected orientation, namely a "longitudinal orientation" in which lengthwise sides of a housing for a HV battery pack are oriented in a first (longitudinal) direction 195 in parallel with the frame rails 140 or a "latitudinal orientation" where the lengthwise sides of a housing for a HV battery pack are oriented orthogonal to the frame rails 140 in a second (latitudinal) direction 197. Herein, the first HV battery pack 130 is positioned with a longitudinal orientation while the second, third and fourth HV battery packs 132, 134 and 136 are positioned with a latitudinal orientation. The thermal base plate 190 is positioned between these HV battery packs 130 and 132. The thermal base plate 190 is coupled to the conduits 185 to receive and provide the flow of coolant to the HV battery packs 130, 132, 134 and 136 as illustrated in more detail in FIG. 6.

III. Thermal Base Plate within the Thermal System Architecture

Figure 2:
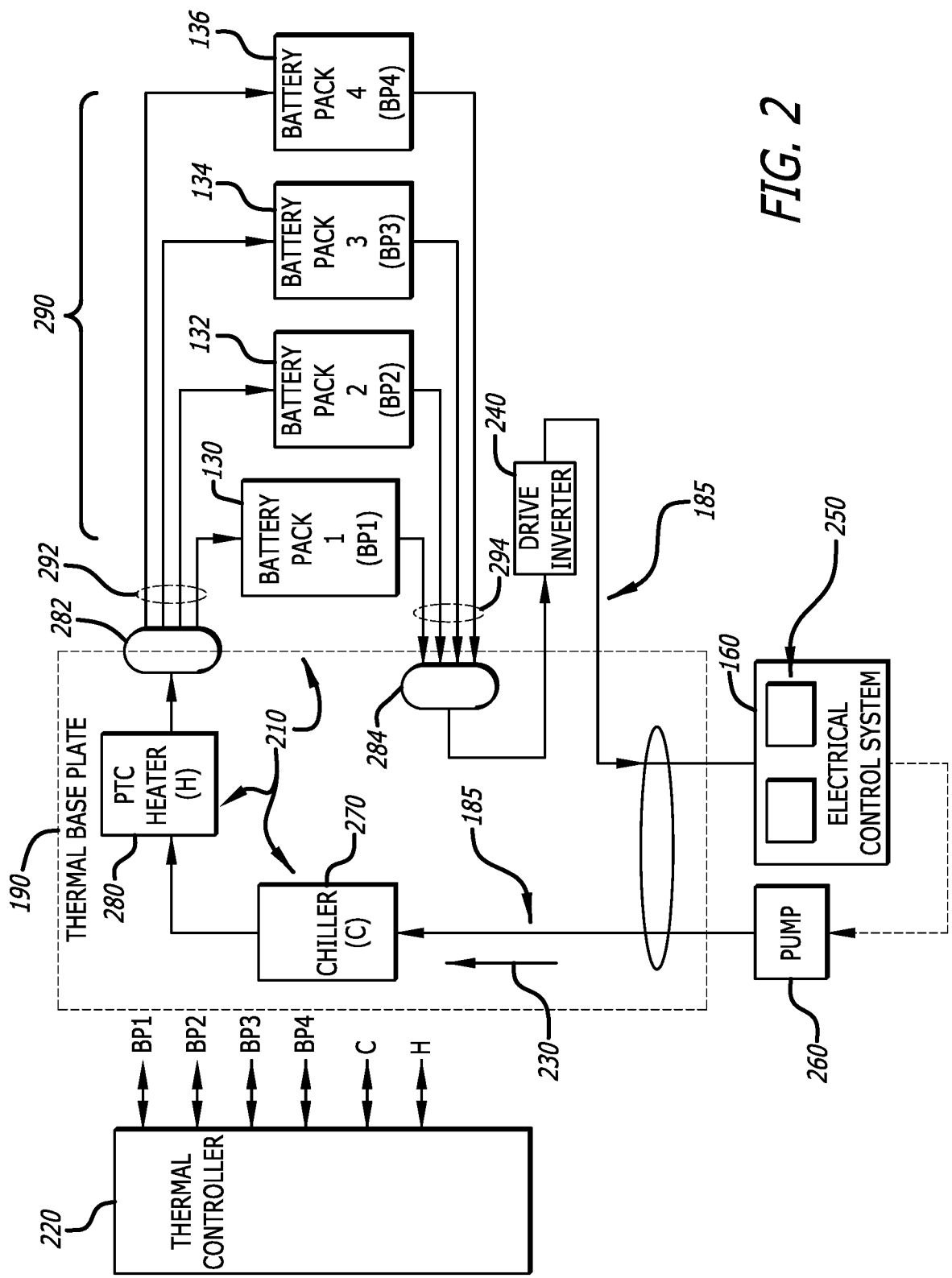
FIG. 2 is a first exemplary embodiment of a thermal system architecture featuring a thermal base plate and deployed within the electric vehicle of FIGS. 1A-1B.

Referring to FIG. 2, a general embodiment of the thermal system 200 deployed within the electric vehicle 100 of FIGS. 1A-1B is shown. The thermal system 200 includes a plurality of vehicle components 210, which are interconnected by the conduits 185 and assist in the flow of coolant 230 throughout the electric vehicle 100. Thermal monitoring logic (hereinafter, "thermal controller") 220 may be used to monitor temperature of the coolant 230 at different locations, where the monitored temperature is provided via signals from thermal sensors (not shown) positioned along the coolant flow path or signals from the thermal controller 220 to extract data associated with the monitored temperature from the thermal sensors.

As shown in FIG. 2, the thermal controller 220 may be configured to control operability of certain vehicle components 210, such as a chiller 270 or a positive temperature coefficient (PTC) heater for example, to adjust the temperature of the coolant 230. As an illustrative example, thermal sensors may be positioned approximate to each of these HV battery packs 130, 132, 134, and/or 136 to provide their measured temperature to the thermal controller 220. In response, the thermal controller 220 may reduce the temperature of the chiller 270 to reduce the temperature of the coolant 230, in efforts to reduce the measured temperature of any or all of the HV battery packs 130, 132, 134, and/or 136.

More specifically, the vehicle components 210 within the coolant flow path may include, but is not limited or restricted to the following: drive inverter 240; electrical components 250 forming the electrical control system 160 (e.g., HV junction box, power distribution unit, etc.); pump 260; the chiller 270; the PTC heater 280; a coolant divergence device 282; a coolant convergence device 284; and/or a cluster of HV battery packs 290 (e.g. HV battery packs 130, 132, 134, 136). According to one embodiment of the disclosure, the thermal base plate 190 is configured to retain the chiller 270, the PTC heater 280, the coolant divergence device 282, and/or the coolant convergence device 284. At the same time, the thermal base plate 190 provides cut-outs and ports for conduits 185 for re-directing the flow of the coolant 230. These conduits 185 may include a first set of conduits 292 extending from ports within the coolant divergence device 282 and a second set of conduits 294 coupled to ports within the coolant convergence device 284 for collection and continued circulation to the drive inverter 240. However, according to another embodiment of the disclosure, the coolant divergence device 282, and/or the coolant convergence device 284 may be deployed as thermal manifolds as illustrated in FIGS. 6A-8E, where they are separately installed within and/or attached to the frame rail 145 of FIG. 1A.

IV. Thermal Base Plate Deployment

Figure 3:
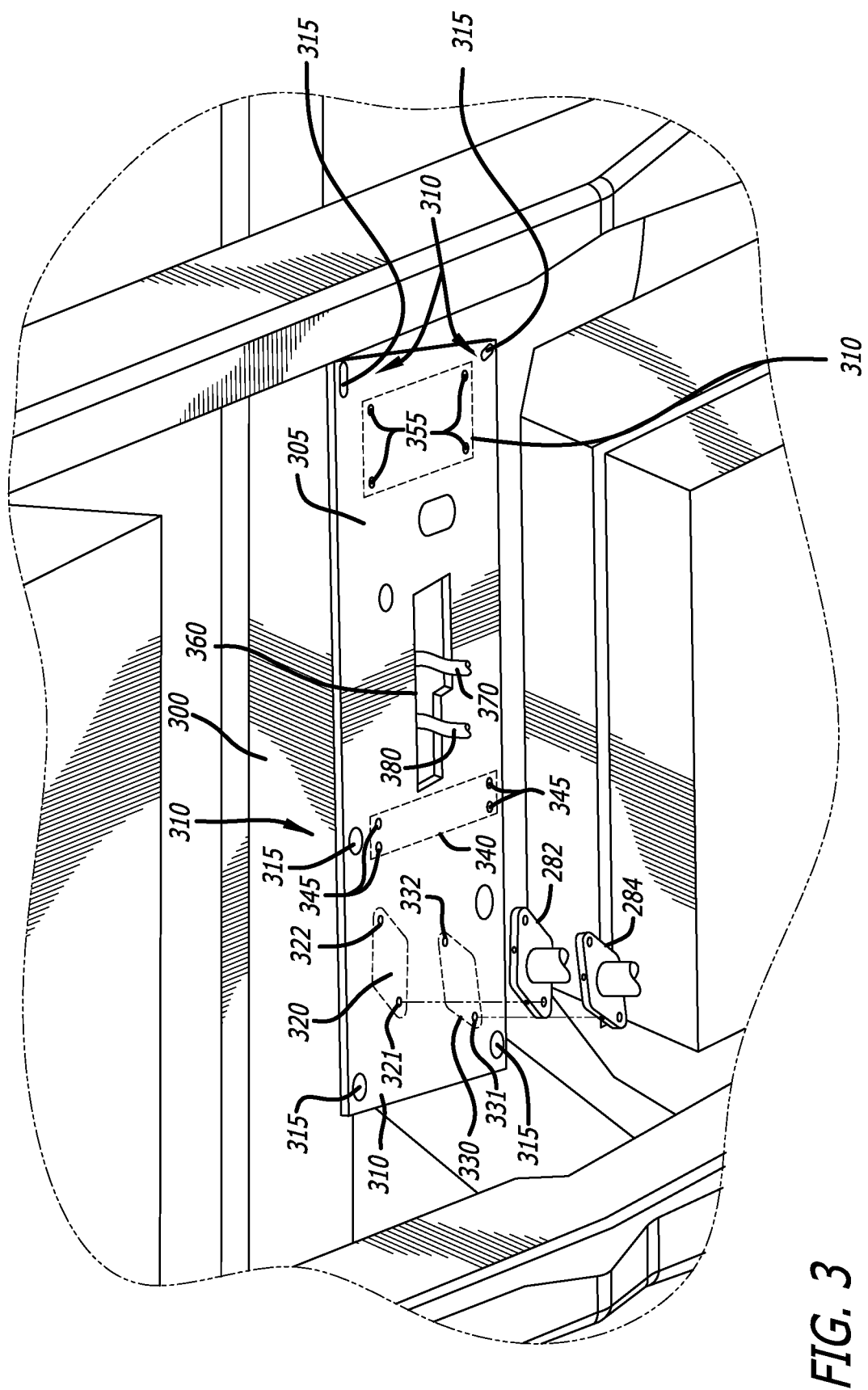
FIG. 3 is an exemplary embodiment of the thermal base plate of FIGS. 1A-2 being installed and coupled to components deployed within the chassis of the electric vehicle.

Referring to FIG. 3, an exemplary embodiment of the thermal base plate 190 being installed as part of the electric vehicle chassis 110 of FIGS. 1A-2 is shown. Herein, the thermal base plate 190 is positioned between the first battery pack 130 and the second battery pack 132 and coupled to a subfloor 300 or another component of the electric vehicle 100 positioned above the HV battery packs 130 and 132. Herein, the thermal base plate 190 include a plurality of plate mounting areas 310, a first mounting area 320, a second mounting area 330, a third mounting area 340, and/or a fourth mounting area 350. Additionally, a first cut-out 360 is provided to provide a pass through for a first conduit 370 routed from the drive inverter 240 to the electrical control system 160 and a second conduit 380 routed from the pump 260 to the chiller 270.

More specifically, the thermal base plate 190 is coupled to the sub-floor 300 through use of fasteners 305 inserted through the apertures 315 formed at the plate mounting areas 310 and attached to the subfloor 300. As an illustrative embodiment, the fasteners 305 may include, but are not limited or restricted to permanent fasteners (e.g., weld, adhesive, etc.) or removable fasteners such as a bolt/washer/nut mechanisms as shown.

The first mounting area 320 of the thermal base plate includes a plurality of apertures 321 and 322, which are aligned with fastening apertures 390 and 391 of the coolant divergence device 282 when positioned to the bottom surface 305 of the thermal base plate 190 and attached by a pair of fasteners (not shown). Similarly, the second mounting area 330 includes a plurality of apertures 331 and 332 for alignment with and attachment to fastening apertures 395 and 396 of the coolant convergence device 284. The coolant convergence device 284 is also mounted to the bottom surface 305 of the thermal base plate 190.

Besides mounting areas 320 and 330, the thermal base plate 190 further comprises the third mounting area 340 for the chiller 270 and the fourth mounting area 350 for the PTC heater 280. The third mounting area 340 is closer in proximity to the first and second mounting areas 320 and 330 than the fourth mounting area 350. The third mounting area 350 includes a plurality of apertures 355 organized in a prescribed pattern to support the chiller 270 suspended from the thermal base plate 190. The fourth mounting area 350 includes a plurality of apertures 355 organized in a prescribed pattern to support the PTC heater 280 suspended from the thermal base plate 190 as shown in FIG. 4.

Figure 4:
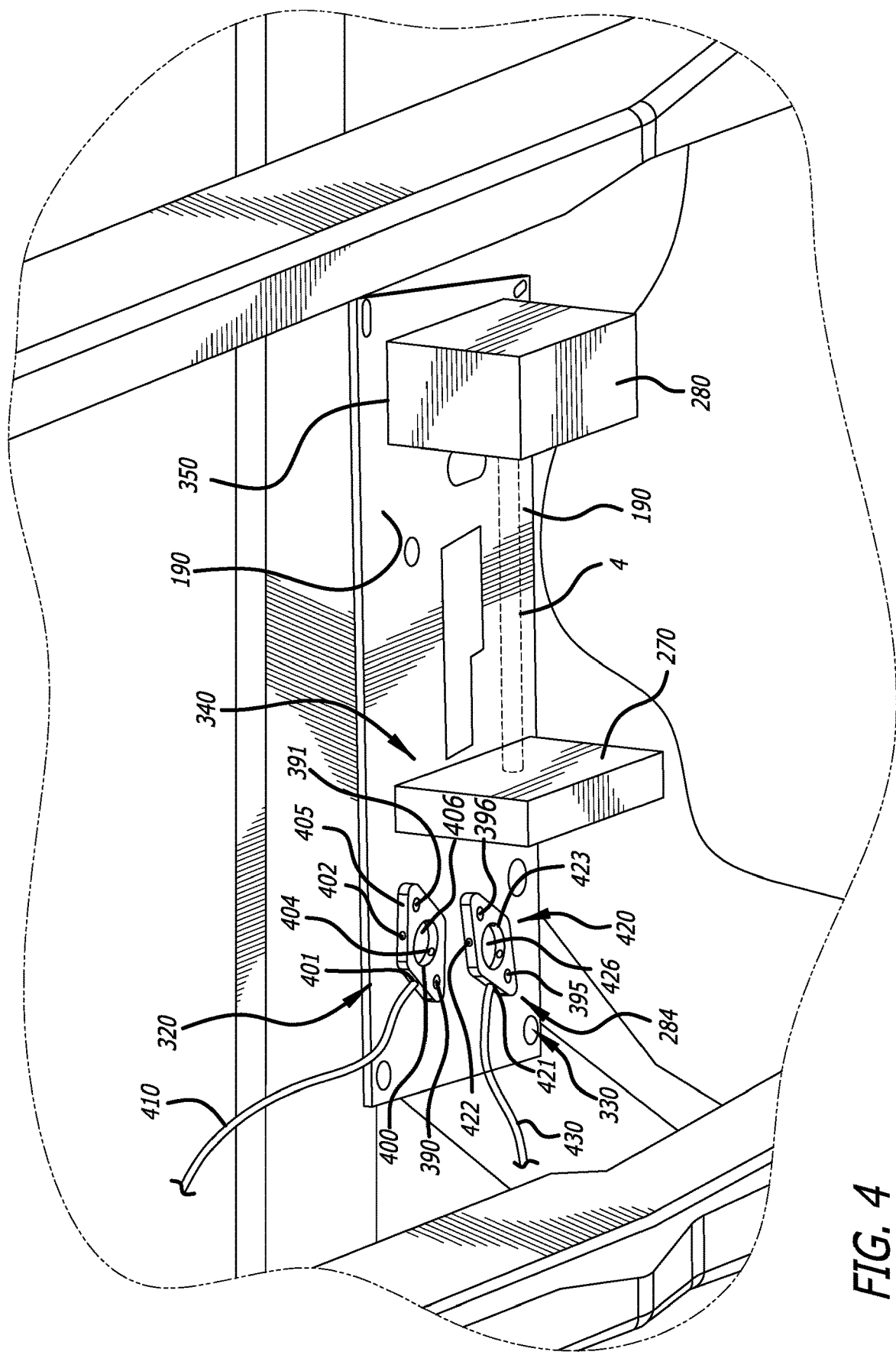
FIG. 4 is an exemplary embodiment the thermal base plate of FIG. 3 with a coolant convergence device and a coolant divergence device installed within the thermal base plate.

Referring now to FIG. 4, an exemplary embodiment the thermal base plate 190 of FIG. 3 to be installed within the electric vehicle and components deployed thereon is shown. Herein, the thermal base plate 190 features the first mounting area 320 for the coolant divergence device 282, the second mounting area 330 for the coolant convergence device 284, the third mounting area 340 for the chiller 270, and/or the fourth mounting area 350 for the PTC heater 280.

More specifically, the first mounting area 320 includes a plurality of apertures 321 and 322 for alignment with fastening apertures 390 and 391 positioned within the coolant divergence device 282 mounted to the bottom surface 305 of the thermal base plate 190. According to one embodiment of the disclosure, the coolant divergence device 282 features an inlet 400 with a plurality of outlets 401-404 located around a periphery 405 with channels into a fluid chamber 406 forming a portion of the inlet 400. The diameter of the inlet 400 is greater than a diameter of each of the outlets 401-404 as the inlet 400 supports a larger volume of coolant than any of the respective outlets 401, 402, 403 or 404. The outlets 401-404 are coupled to conduits 292 (see FIG. 2), each of these conduits 292 is designated to be uniquely coupled to one of the HV battery packs 130, 132, 134, or 136. As an illustrative example, conduit 410, being one of the conduits 292, is configured to provide coolant to the second HV battery pack (not shown).

Similarly, the second mounting area 330 includes a plurality of apertures 331 and 332 for alignment with fastening apertures 395 and 396 positioned within the coolant convergence device 284 mounted to the bottom surface 305 of the thermal base plate 190. According to one embodiment of the disclosure, the coolant convergence device 284 features an outlet 420 with a plurality of inlets 421-424 located around a periphery 425 with channels formed for fluid communication with a fluid chamber 426 forming a portion of the outlet 420. The diameter of the fluid chamber 426 is greater than a diameter of each of the inlets 421-424 as the outlet 420 supports a larger volume of coolant than each of the inlets 421-424. The inlets 421-424 are coupled to the conduits 294 (see FIG. 2), each of these conduits 294 is designated to be uniquely coupled to one of the HV battery packs 130, 132, 134, or 136. For example, conduit 430 is configured to receive coolant the second HV battery pack 132 via inlet 421 as other inlets 422-414 are configured to receive coolant made available to and propagating from conduits (not shown) associated with the other HV battery packs 130, 134 and 136 shown in FIGS. 1A-1B.

Besides mounting areas for the coolant divergence device 282 and the coolant convergence device 284, the thermal base plate 190 further comprises the third mounting area 340 for the chiller 270 and the fourth mounting area 350 for the PTC heater 280. A conduit 440 is configured for providing coolant received via the conduit 380 from the pump 260 of FIG. 2, which is fed through the cut-out 360 as shown in FIG. 3.

V. Thermal System Operational Flow

Figure 5:
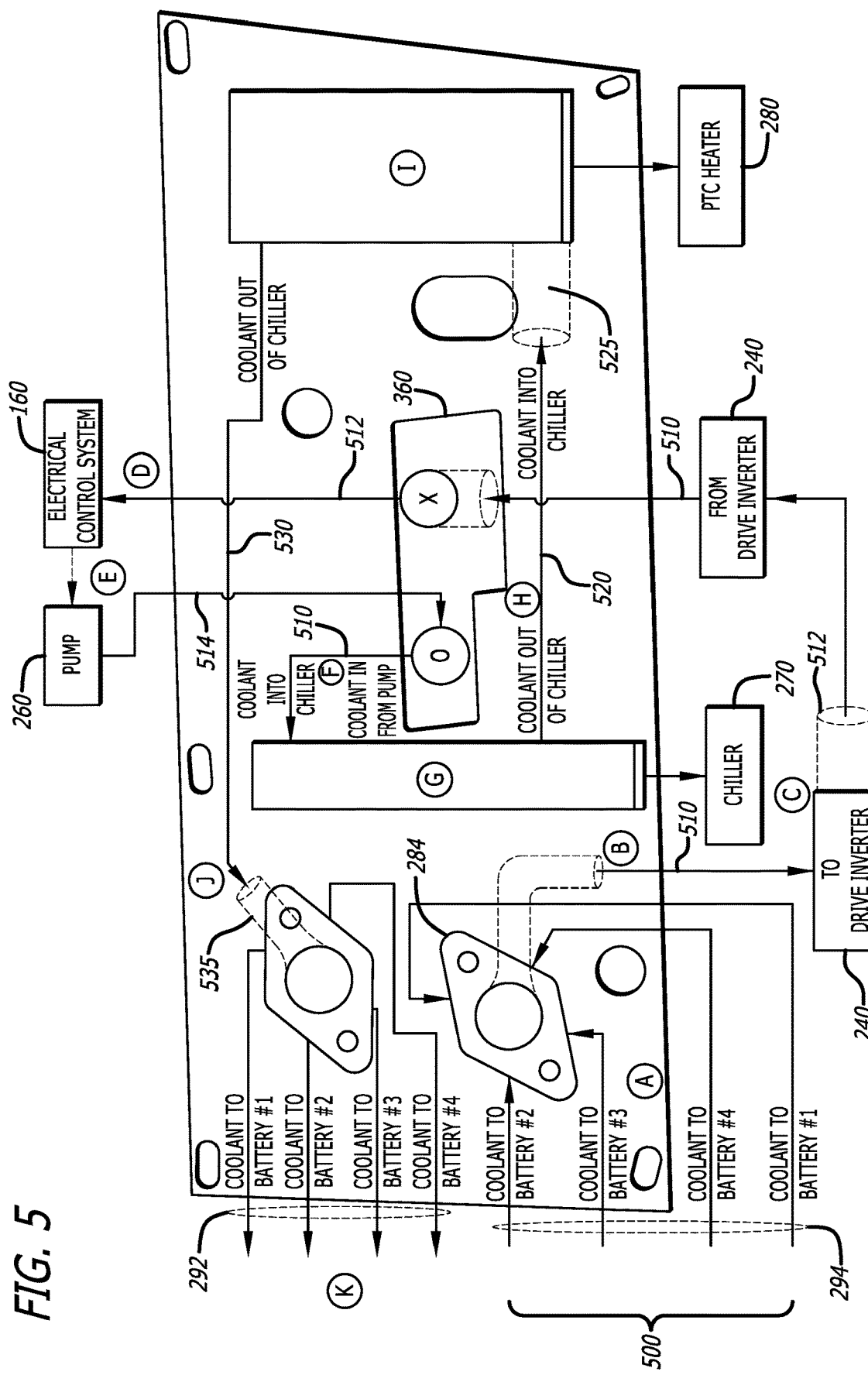
FIG. 5 is an illustrative embodiment of the coolant flow supported by the thermal base plate of FIG. 4.

Referring to FIG. 5, an illustrative embodiment of the coolant flow through an EV thermal system architecture, which may be supported by the thermal base plate 190 of FIGS. 3-4, is shown. Herein, the coolant convergence device 284 is configured to receive flows of coolant 500 via conduits 294, where the coolant was previously provided for thermal management of each of the HV battery packs (operation A). The coolant convergence device 284 combines the coolant flows 500 to produce an aggregated coolant flow 510 (operation B). The aggregated coolant flow 510 is provided to the drive inverter 240 for thermal management such as cooling or heating of the drive inverter 240 depending on environmental conditions experienced by the electric vehicle (operation C). Thereafter, the drive inverter 240 subsequently provides the coolant flow 510, propagating through conduit 512 oriented for routing through cut-out 360, to the electrical control system 160 for thermal regulation (cooling or heating) of components associated with the electrical control system 160 (operation D).

The coolant flow 510 (or portions thereof) may be circulated from the electrical control system 160 to the pump 260 (operation E). Thereafter, the pump 260 propagates the coolant flow 510 via conduit 514 that is arranged to pass through the cut-out 360 and coupled to the chiller 270 (operation F). The operability of the chiller 270 is controlled by a thermal controller (not shown), which applies a prescribed level of cooling to modify the temperature of the coolant 510. After the chiller 270 has conducted the prescribed level of cooling (e.g., reducing the temperature of the coolant 510 or providing no further cooling when heating is needed), coolant 520 is provided via conduit 525 to the PTC heater 280 (operations G, H).

Upon receipt of the coolant 520, the PTC heater 280 may increase the temperature of the coolant 520 prior to propagation back to the HV battery packs (operation I). The thermal management of the coolant 520 through cooling and/or heating is conducted to maintain the temperature of the HV battery packs within a selected temperature range (e.g., 25-50° Celsius) in efforts to achieve optimal battery performance. With optimal battery performance, a maximum driving distance for the electric vehicle may be realized.

Thereafter, the PTC heater 280 provides the thermally managed coolant 530 via conduit 535 to the coolant divergence device 282 (operation J). The coolant divergence device 282 receives the coolant 530 and allocates portions of the coolant 530 into separate conduits 292 to return coolant to the HV battery packs for thermal management (operation K). Thereafter, the coolant undergoes re-circulation throughout the electric vehicle as organized by the thermal base plate as described in operations A-K).

VI. Thermal Manifold within the Thermal System Architecture

In general, due to increased performance requirements, this (class 4) EV thermal system architecture has a higher demand for coolant flow rates. Custom-made thermal manifolds (also referred to as "manifolds") may be needed in order to meet these flow rate targets and limit the number of pumps being installed to reduce overall costs of the thermal system and the electric vehicle. Besides splitting (diverging) and/or merging (converging) the coolant flow, each manifold is also configured to be highly modular with ports configured to receive (i) different connector fitting sizes for attachment to different sized conduits, (ii) pressure and/or temperature sensors, and (iii) a bleed valve to be utilized to remove air out of the coolant being circulated during servicing. According to one embodiment of the disclosure, each manifold may be adapted with different port types, depending on their intended operability, including One (1) inch: Three (3) one-inch ports intended for coupling with connector fittings for one-inch hoses. These ports may be reserved for high coolant flowrates branches (>10 litres per minute "lpm") or for the branches with higher pressure drops. For one embodiment, these ports are accessible on the sides and rear surfaces of the manifold.

Three-Quarter (¾) inch: Two (2) ¾-inch ports for splitting/merging flow between battery packs and drive train components with general flow rate targets (5-12 lpm). For one embodiment, these ports are accessible on the front region of the manifold.

One-Quarter (¼) inch: One (1) ¼ inch port designed for installation of a bleed port valve or mechanical pressure gauge for diagnostics. For one embodiment, these ports are accessible on the front region of the manifold.

One-Eighth (⅛) inch: Two (2) ⅛-inch ports for pressure and/or temperature sensor (transducer) installation. For one embodiment, these ports are accessible on the front region of the manifold.

The targeted main coolant supply features a flow rate of 25 lpm. According to one embodiment of the disclosure, a supply manifold may be assigned to each pair of battery packs (B1-B2 and B3-B4) and a return manifold may be assigned for each pair's return flow. Hence in total, four (4) manifolds may be utilized as part of a thermal management architecture to support a four HV battery pack electric vehicle. Also, two or more manifolds may be utilized for cooling of the power train components.

For the six (6) HV battery pack configuration, the main supply coolant flow rate rises up to 40 lpm. To support this thermal system architecture, according to one configuration, an one-inch port accessible at the rear region of the each supply and return manifold may be utilized and included as part of the coolant flow path. These ports may be utilized to provide coolant to two additional HV battery packs. Other configurations may be utilized.

The sensor ports on the manifolds are utilized to install pressure and/or temperature sensors. For example, for the power train cooling, it is important to predict the cooling load estimate in order to activate a high-performance cooling mode. This estimation is performed by the temperature sensor readings at the supply and return manifolds. Similarly, pressure sensors can be used as a calibration point to estimate the coolant flow rates. Hence, the manifold provides designated locations for the sensors.

Figure 6A:
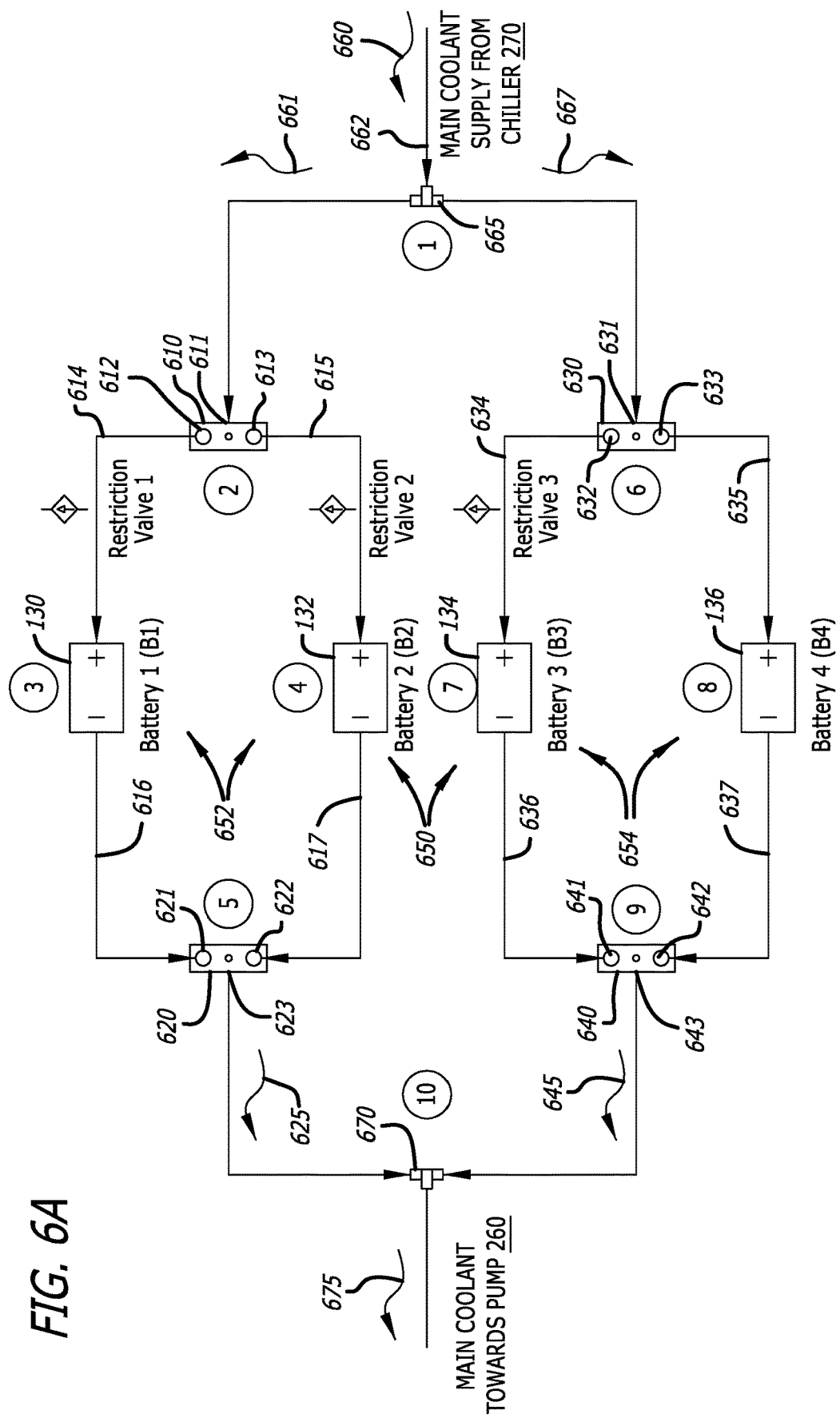
FIG. 6A is a second exemplary embodiment of a thermal system architecture featuring thermal manifolds for cooling of multiple battery packs deployed within the electric vehicle of FIGS. 1A-1B.

Referring to FIG. 6A, a second exemplary embodiment of a thermal system architecture 600 featuring thermal manifolds 610, 620, 630 and 640 for cooling of multiple HV battery packs 650 deployed within the electric vehicle of FIGS. 1A-1B. Herein, coolant 660 supplied via one or more conduits 662 from the chiller 270 of FIG. 2 is provided to a first valve 665 (e.g., T-valve), which directs a first flow 661 of the coolant 660 to the first (supply) manifold 610 and a second flow 667 of the coolant 660 to the third (supply) manifold 630 (operation 1). Herein, the first manifold 610 includes at least one inlet port 611 to receive the coolant 661 from the first valve 665 and a plurality of outlet ports (e.g., outlet ports 612 and 613), each adapted to receive a connector for attachment to conduits 614 and 615, respectively. The connectors may include, but are not limited or restricted to barbed fittings as shown below in FIG. 7.

The conduits 614 and 615 provide coolant to a first pair of HV battery packs 652 (operations 2-3), such as the first HV battery pack 130 and the second HV battery pack 132 of FIG. 1A. It is contemplated that the HV battery pack group 652 may be a different combination of HV battery packs than HV battery packs 130 and 132. For example, the first manifold 610 may include additional outlet ports to provide coolant to three or more HV battery packs, power train components, or other components within the electric vehicle.

As further shown in FIG. 6A, conduits 616 and 617 may be coupled to outlets for each HV battery pack associated with the first HV battery pack group 652 (e.g., HV battery packs 130 and 132). The conduits 616 and 617 may be attached to connectors (e.g., fittings) adapted for coupling to at least two inlet ports 621 and 622 of the second (return) manifold 620 to provided heated coolant thereto (operations 3-4). The second manifold 620 includes at least one outlet port 623 for coupling (via conduits) to a second valve 670 to provide a first portion of the converged, heated coolant 675 received after propagation of a portion of this coolant 625 through the HV battery pack group 652 (operation 5).

Similarly, supplied via the conduit(s) 662 from the chiller 270 of FIG. 2, the second flow 667 of the coolant 660 is directed from the first valve 665 (e.g., T-valve) to the third (supply) manifold 630 (operation 1). Herein, the third manifold 630 includes at least one inlet port 631 to receive the coolant 667 from the first valve 665 and a plurality of outlet ports 632 and 633 each adapted to receive a connector for attachment to conduits 634 and 635, respectively. The conduits 634 and 635 provide coolant to a second pair of HV battery packs 654 via an inlet (not shown), such as the third HV battery pack 134 and the fourth HV battery pack 136 of FIG. 1A (operation 6). It is contemplated that the HV battery pack group 654 may be a different combination of HV battery packs.

As further shown, conduits 636 and 637 may be coupled to outlets of each HV battery pack associated the second HV battery pack group 654 (e.g., HV battery packs 136 and 138). The conduits 636 and 637 may be attached to connectors installed on two inlet ports 641 and 642 of the fourth (return) manifold 640 to provide heated coolant circulated around the components such as the HV battery packs 136 and 138 as shown (operations 7-8). The fourth manifold 640 includes at least one outlet port 643 for coupling to the second valve 670 to provide a second portion of the converged, heated coolant 675 received after propagation of coolant 645 through the HV battery pack group 654 (operation 9). The second valve 670 is coupled to the pump 260 of FIG. 2 to provide the heated coolant thereto (operation 10).

Figure 6B:
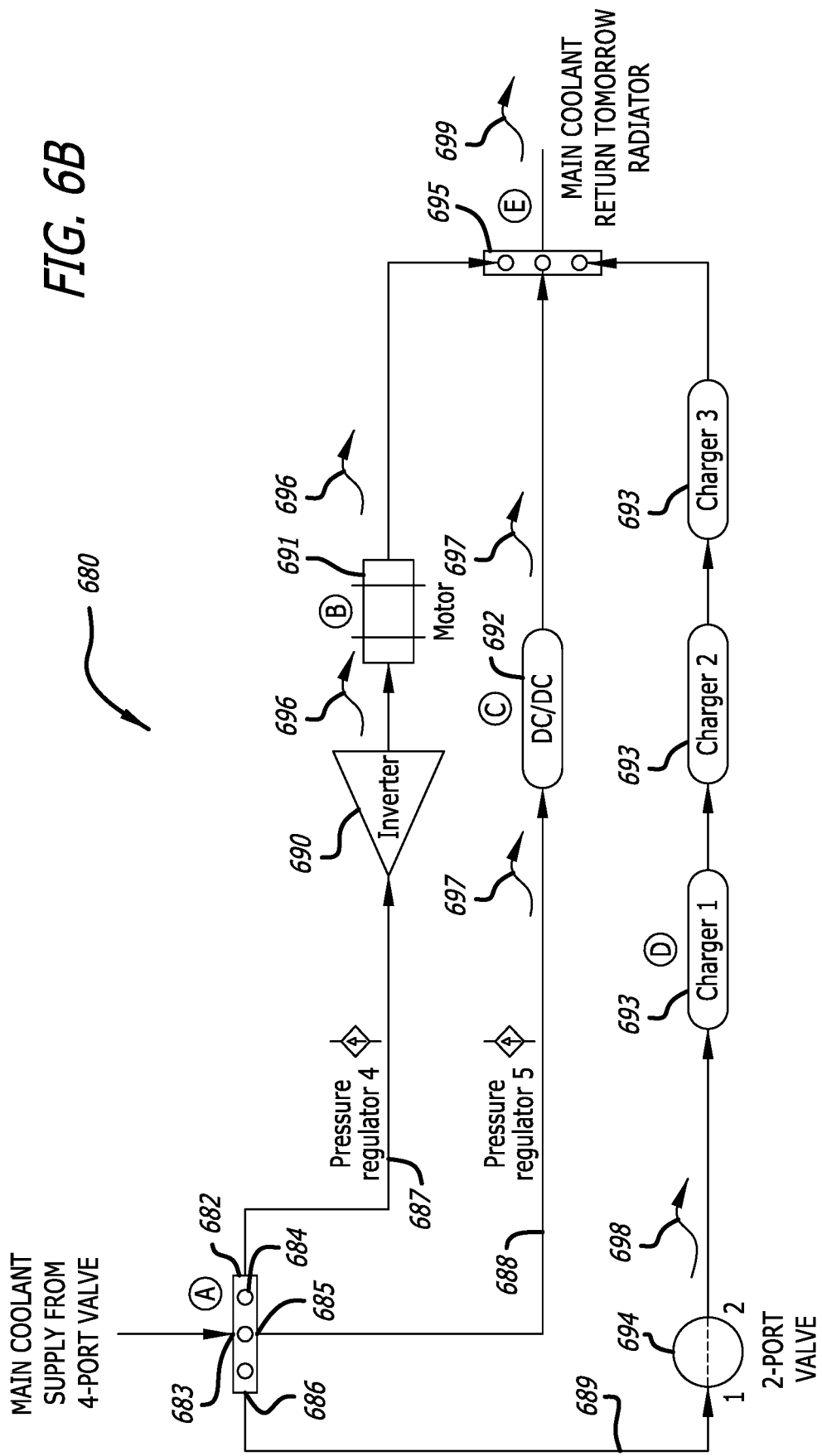
FIG. 6B is a third exemplary embodiment of a thermal system architecture featuring thermal manifolds for cooling of components other than the battery packs that are deployed within the electric vehicle of FIGS. 1A-1B.

Referring now to FIG. 6B, a third exemplary embodiment of a thermal system architecture 680 featuring a first thermal (supply) manifold 682 for cooling of components other than the battery packs that are deployed within the electric vehicle of FIGS. 1A-1B is shown. Herein, the first manifold 682 receives coolant from a 4-port valve 684, which receives a flow of the coolant from a heat sink device (e.g., radiator) and/or a pump (operation A). The first manifold 682 features a plurality of ports, which include an inlet port 683, a first outlet port 684, a second outlet port 685, and a third outlet port 686. In particular, conduits 687, 688 and 689 are coupled to the first outlet port 684, the second outlet port 685, and the third outlet port 686, respectively.

Herein, as an illustrative example, the first conduit 687 is configured to provide coolant to an inverter 690, where resulted heated coolant 696 flows through a motor 691 for receipt by a second thermal (return) manifold 695 (operation B). The aggregation of heated coolant 699 returns to a heat sink device (e.g., radiator) via outlet ports of the second manifold 695. The second conduit 688 is configured to provide coolant 697 to a power converter 692 to alter the DC volage level as needed (operation C). Similarly, the coolant 697 propagating through the second conduit 688 experiences a change in temperature (e.g., extracting heat from the power converter 692) and is returned to the second manifold 695 and returned to a heat sink device as part of the aggregated heated coolant 699.

Lastly, the third conduit 689 is configured to provide coolant 698 to one or more chargers 693 based on selection using a 2-port valve 694. Propagating through the third conduit 689, the coolant 698 experiences a change in temperature (e.g., extracting heat from the charger(s) 693) and is returned the second thermal manifold 695 for subsequent propagation to the heat sink device as part of the aggregated heated coolant 699 (operation D). Of the three control flow paths to inverter/motor 690/691, power converter 692, and charger(s) 693), one or more components with the greatest cooling needs may be coupled to outlet ports with the largest diameters (e.g., 1-inch port) while other components may be attached to ports with lesser diameters (e.g., ¾-inch ports).

VII. Thermal Manifold Deployment

Figure 7:
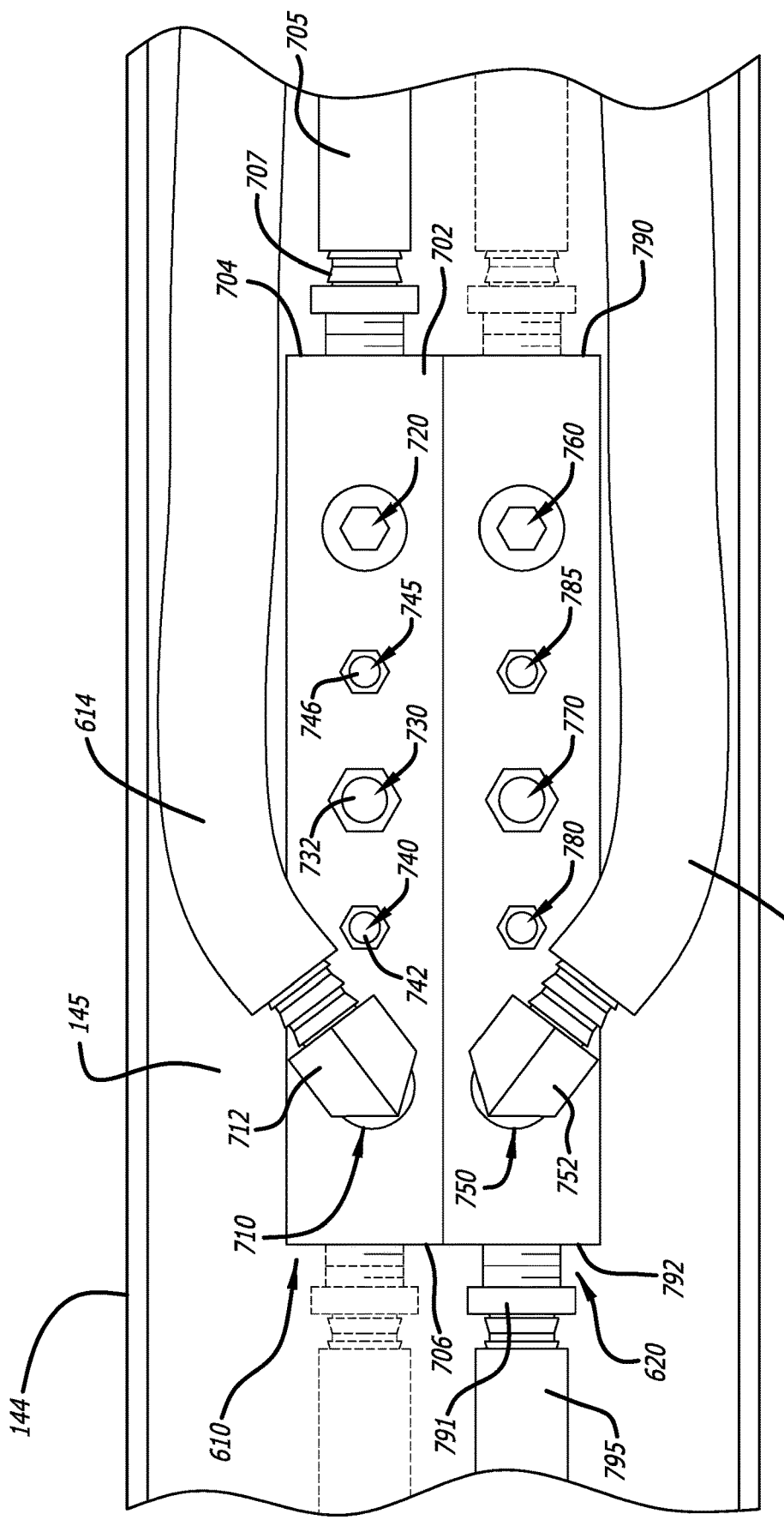
FIG. 7 is an exemplary embodiment of thermal manifolds of FIG. 6 including a first thermal manifold operating as an inlet manifold and a second thermal manifold operating as an outlet manifold to circulate coolant proximate and internally within components deployed within the chassis of the electric vehicle.

Referring to FIG. 7, an exemplary embodiment of the first thermal manifold 610 and the second thermal manifold 620 of FIG. 6A in a stacked formation within the frame rail 145 is shown. Herein, the first manifold 610 is configured to operate as a supply manifold 610 while the second manifold 620 is configured to operate as a return manifold. Collectively, the first and second manifolds 610 and 620 provide a coolant flow path to circulate coolant proximate and/or internally within components deployed within the chassis of the electric vehicle. For example, as shown in FIG. 6A, the first and second manifolds 610 and 620 provide a coolant flow path for the HV battery pack group 652.

According to this embodiment disclosure, the first manifold 610 is positioned and vertically aligned with the second manifold 620. A front region 702 of the first manifold 610 includes a plurality of ports, including a first outlet port 710, a second outlet port 720, a diagnostic port 730, and a pair of sensor ports 740 and 745 configured to receive and maintain sensors such as pressure sensors and/or temperature sensors. As shown, a bleeder valve 732 is positioned on the diagnostic port 730 and plugs 722, 742 and 746 are positioned on ports 720, 740 and 745, respectively.

As shown in FIG. 7, the first outlet port 710 is configured to receive a connector 712 (e.g., barbed 90° fitting) that is sized to receive the conduit 614 that provides coolant to a HV battery pack (e.g., first HV battery pack 130 of FIG. 6A). The connector 712 is threaded into the first outlet port 710, where first outlet port 710 may feature threading that mates with a threaded base portion of connector 712.

Additionally, the first manifold 610 includes ports positioned on its side regions 704 and 706. As an illustrative example, a first side region 704 may include a port (e.g., port 832 of FIG. 8A) adapted to receive a connector (e.g., barbed fitting), which supply coolant to flow into the first manifold 610 over conduit 705. The second side region 706 may include a port (e.g., port 842 of FIG. 8C) to operate as an outlet port to provide coolant to a selected component of the electric vehicle, as needed. The sizing of the side region ports has a diameter greater than the first and second outlet ports 710 and 720 that are positioned along the front region 702 of the first manifold 610.

Positioned below the first manifold 610, the second manifold 620 features the same port architecture as the first manifold 610. However, the second manifold 620 operates as a return thermal manifold and is positioned as part of the return path for coolant after being provided from a component via the first manifold 610. As shown, the second manifold 620 includes a plurality of ports, including a first inlet port 750, a second inlet port 760, a diagnostic port 770, and a pair of sensor ports 780 and 785 configured to receive and maintain sensors such as pressure sensors and/or temperature sensors. As also shown, a bleeder valve 772 is positioned on the diagnostic port 770 and plugs 762, 782 and 786 are positioned on ports 760, 780 and 785, respectively.

As still shown in FIG. 7, the first inlet port 750 is configured to receive a connector 752 (e.g., barbed 90° fitting) that is sized to receive the conduit 616 that provides coolant from a HV battery pack (e.g., the first HV battery pack 130 of FIG. 6A) after circulation for cooling of that HV battery pack. The connector 752 is threaded into the first inlet port 750, where first inlet port 750 may feature threading that mates with a threaded base portion of connector 752.

Additionally, the second manifold 620 includes ports positioned on its side regions 790 and 792. As an illustrative example, the second side region 792 may include a port adapted to receive a connector 791 (e.g., barbed fitting), which operates as an outlet for coolant received by the second manifold 620 to provide heated coolant via conduit 795 to a pump and/or heat sink device for subsequent circulation to the chiller. The first side region 790 may include a port to operate as an inlet port to receive coolant from a selected component of the electric vehicle after circulation. The sizing of the side region ports has a diameter greater than the first and second inlet ports 750 and 760 that are positioned along the front region 752 of the second manifold 620.

As shown, this manifold pairing can support a four (4) HV battery pack charging system and/or power train components such as an inverter, DC-DC power converter and chargers as shown in FIGS. 6A and 6B. This is accomplished by a port that is located on the back side of the manifold (not shown) which allow for up to four connection points for a flow of coolant from a coolant source.

Figure 8A:
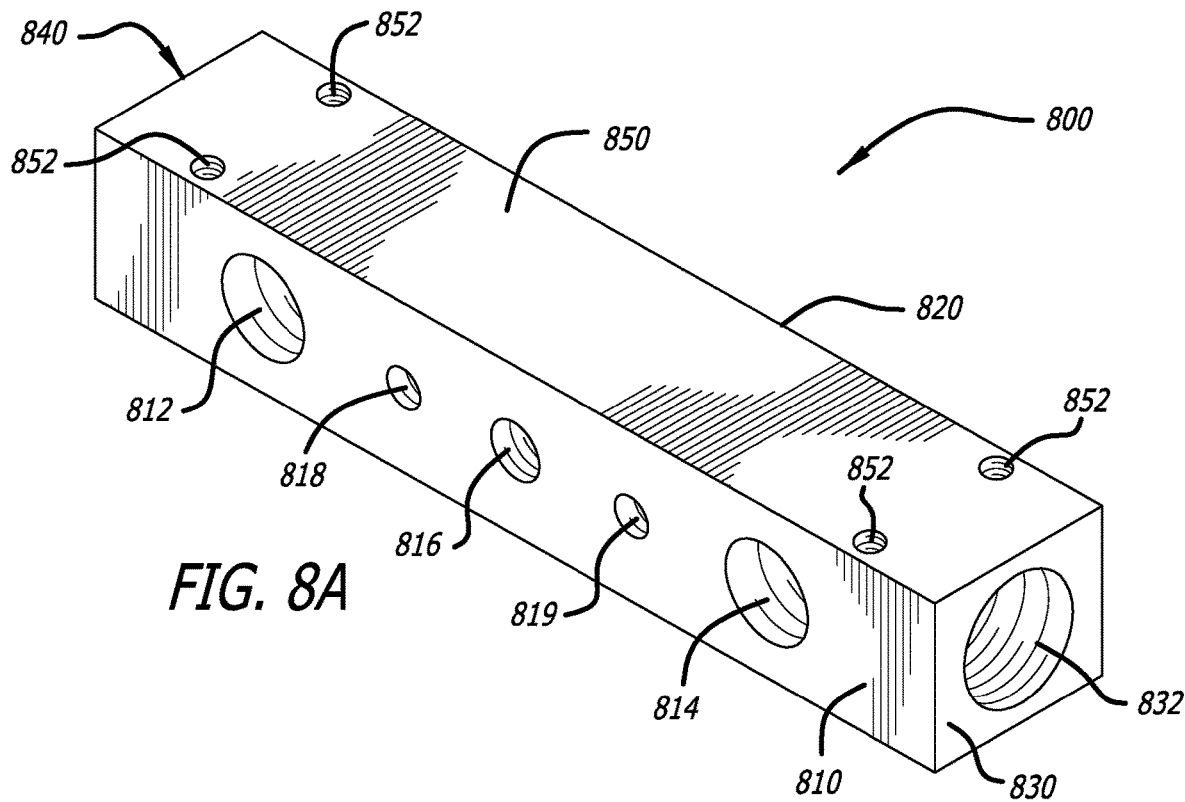
FIG. 8A is a first perspective view of an exemplary embodiment of a thermal manifold of FIGS. 6-7.

Referring now to FIG. 8A, a first prospective view of an exemplary embodiment of a thermal manifold 800 (e.g., same construction as the thermal manifolds 610, 620, 630 and 640 of FIGS. 6A, 6B and FIG. 7) is shown. Herein, the thermal manifold 800 includes a front region 810, a back region 820, a first side region 830, and a fourth side region 840. The front region 810 includes a first port 812 and a second port 814. Operating as a supply manifold as the first thermal manifold 610 of FIG. 7 for example, the thermal manifold 800 includes ports 812/814 that are configured to output supply coolant to selected components within the electric vehicle. These components may include an HV battery pack, or non-battery pack components such as an inverter, power converter, charger, or the like.

The front region 810 further includes a port 816 for insertion of a bleeder valve (see valve 732 of FIG. 7), which allows for the release of air within the conduits of the thermal system. Deployed as a supply manifold 610 or a return manifold 620 as shown in FIG. 7, the thermal manifold 800 would be positioned vertically above the components being cooled to allow air to rise and to be expelled using the bleeder valve as needed. The front region 810 further includes ports 818 and 819, which adapted to receive temperature and/or pressure sensors to allow for the monitoring of coolant flow through different ports within the manifold 800.

Accessible via a top surface 850 of the thermal manifold, inserts 852 (e.g., threaded recesses, cylindrical apertures, etc.) may be positioned to allow for threaded posts (or screws) of an attachment bracket to be attached thereto. Alternative connection means may be utilized, such as insertion of a non-threaded post through inserts 852 with attachment at a bottom region). The inserts 852 are provided for use in the retention of the thermal manifold 800 (or multiple manifolds with the inserts aligned) to the frame rail 145. The inserts 852 are positioned at the respective corner areas of the manifold 800 and are more proximate to the first side region 830 and the second side region 840 than a central region of the manifold 800.

Figure 8B:
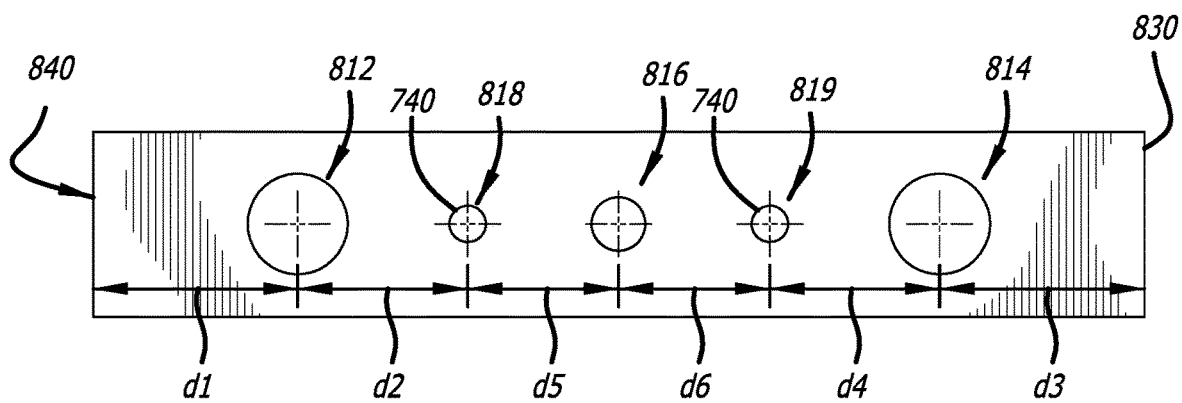
FIG. 8B is a front view of the exemplary embodiment of the thermal manifold of FIG. 8A.

Referring now to FIG. 8B, a front view of the exemplary embodiment of the thermal manifold 800 of FIG. 8A is shown. Herein, the front region 810 includes the first port 812 having a center point oriented at a distance (d1) from the second side region 840 that is greater than a distance (d2) to a center point of the sensor port 818. Also, the front region 810 includes the second port 814 having a center point oriented at a distance (d3) from first side region 830 that is greater than a distance (d4) to a center point of the sensor port 819. Similarly, the sensor ports 818 and 819 are located further from a center point of the first and second ports 812 and 814 (distances d2, d4) than a center point of the diagnostic port 816 (distances d5, d6).

Figure 8C:
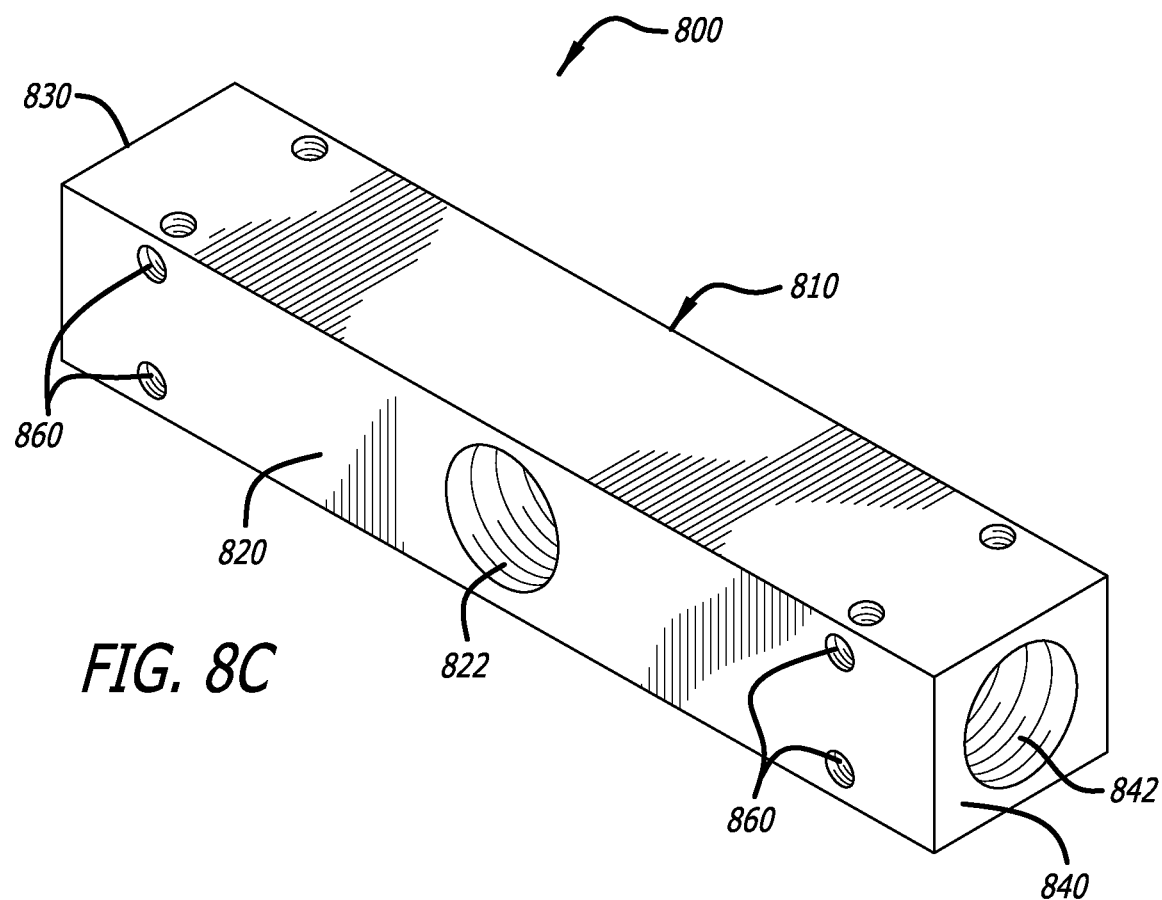
FIG. 8C is a second perspective view of an exemplary embodiment of the thermal manifold of FIG. 8A.
Figure 8D:
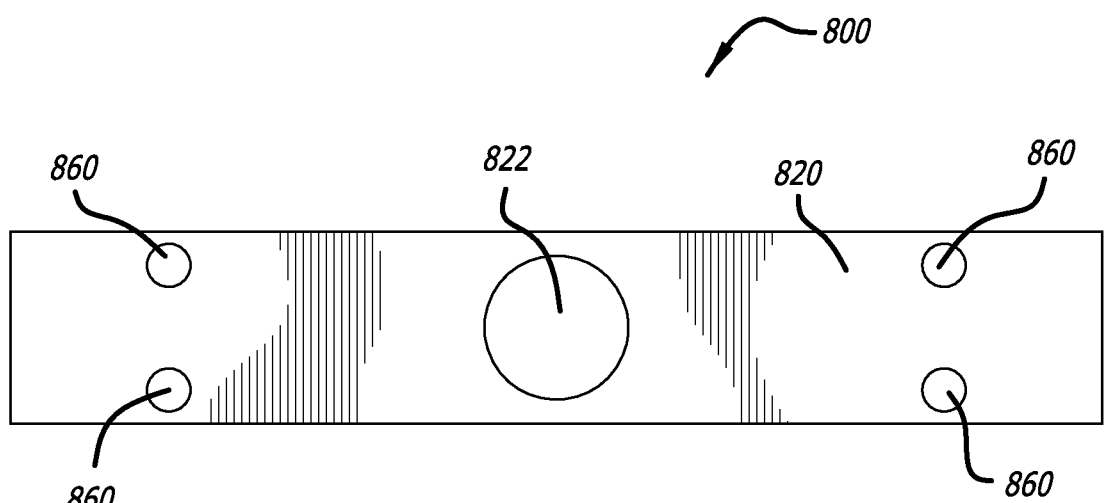
FIG. 8D is a rear view of the exemplary embodiment of the thermal manifold of FIG. 8A.
Figure 8E:
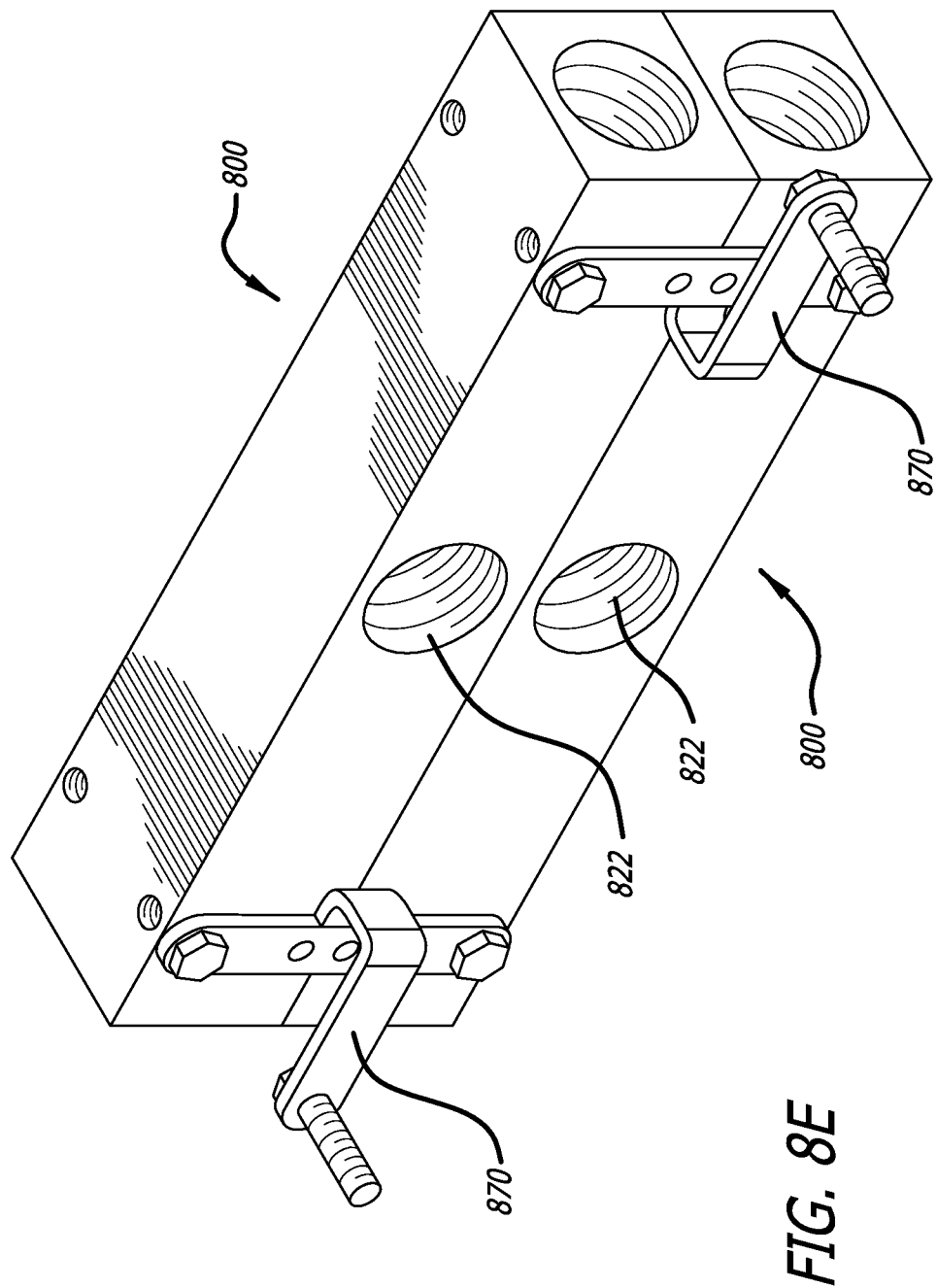
FIG. 8E is a rear view of the exemplary embodiment of a pairing of thermal manifolds with frame attachment brackets for coupling to a frame rail of the electric vehicle.

Referring now to FIG. 8C, a second prospective view of an exemplary embodiment of the thermal manifold 800 of FIG. 8A is shown. Herein, the back region 820 of the manifold 800 is shown. The back region 820 includes a port 822 sized to be equivalent to a port 832 positioned at the first side region 830 (see FIG. 8A) and a port 842 positioned at the second side region 840. Additionally, as shown in FIG. 8D, the back region 820 includes inserts 860 positioned toward the side regions 830/840 of the manifold 800 for coupling to the frame rail using one or more frame attachment brackets 870 as shown in FIG. 8E.

In the foregoing description, the invention is described with reference to specific exemplary embodiments thereof. However, it will be evident that various modifications and changes may be made thereto without departing from the broader spirit and scope of the invention.

What is claimed is:

1. A thermal management unit implemented within an electric vehicle that includes a plurality of battery packs, comprising:
   a base plate including a first mounting area and a second mounting area;
   a coolant convergence device coupled at the first mounting area of the base plate, the coolant convergence device including (i) a first plurality of inlets each coupled to a conduit to receive a flow of coolant propagating through or adjacent to a battery pack of the plurality of battery packs and (ii) an outlet that aggregates and outputs a coolant flow formed by the flows of coolant received from the plurality of conduits associated with each inlet of the plurality of inlets; and
   a coolant divergence device coupled at the second mounting area of the base plate, the coolant divergence device including (i) an inlet to receive the coolant flow from at least a first vehicle component and (ii) a first plurality of outlets fluidly coupled to the inlet, each of the first plurality of outlets being coupled to a conduit to receive a portion of coolant associated with the coolant flow for propagation to a corresponding battery pack of the plurality of battery packs for thermal management,
   wherein the inlet of the coolant divergence device is positioned on a first side region of the first coolant divergence device and has a diameter larger than a diameter of each of the first plurality of outlets of the coolant divergence device.

2. The thermal management unit of claim 1, wherein base plate further comprises a third mounting area reserved for mounting and coupling the first vehicle component to the base plate.

3. The thermal management unit of claim 2, wherein the first vehicle component includes a positive temperature coefficient (PTC) heater.

4. The thermal management unit of claim 3, wherein the base plate further comprises a fourth mounting area reserved for mounting and coupling of a second vehicle component to the base plate, the second vehicle component being adapted to receive the coolant flow from a pump and to propagate the coolant flow to the PTC heater.

5. The thermal management unit of claim 4, wherein the second vehicle component includes a chiller.

6. The thermal management unit of claim 5, wherein both the chiller and the PTC heater are coupled to and hanging from the base plate.

7. The thermal management unit of claim 1 further comprising a third mounting area reserved for mounting and coupling of a first vehicle component to the base plate and a fourth mounting area reserved for mounting and coupling of a second vehicle component to the base plate, wherein the first vehicle component and the second vehicle component operate to alter a temperature of coolant within the coolant flow to a predetermined temperature range prior to return of the coolant to the plurality of battery packs via the coolant divergence device.

8. The thermal management unit of claim 1, wherein the first plurality of outlets is positioned around a periphery of a fluid chamber forming a portion of the inlet of the coolant divergence device.

9. The thermal management unit of claim 1, wherein the first plurality of inlets is positioned around a periphery of a fluid chamber forming a portion of the outlet of the coolant convergence device.

10. A thermal system implemented within an electric vehicle including a plurality of battery packs, comprising:
    a first manifold including (i) a first inlet port coupled to a first conduit to receive a flow of coolant supplied from a coolant source, and (ii) one or more outlet ports each coupled to a conduit for propagating coolant through or adjacent to a battery pack of the plurality of battery packs, wherein the first inlet port is positioned on a first side region of the first manifold and has a diameter larger than a diameter of each of the one or more outlet ports; and
    a second manifold including (i) a plurality of inlet ports each coupled to a conduit communicatively coupled to a battery pack of the plurality of battery packs to receive a flow of coolant from the battery pack, and (ii) an outlet port configured to output an aggregate of the flows of coolant received from the plurality of conduits.

11. The thermal system of claim 10, wherein the first manifold further comprises a diagnostic port to receive a bleeder valve for removal of air present in a plurality of conduits including the first conduct and the conduits associated with the one or more outlet ports.

12. The thermal system of claim 11, wherein the first manifold further comprises a first sensor port configured to receive and maintain a temperature sensor.

13. The thermal system of claim 12, wherein the first manifold further comprises a second sensor port configured to receive and maintain a pressure sensor.

14. The thermal system of claim 10, wherein the first manifold and the second manifold are positioned within a channel of a frame rail and coupled to the frame rail.

15. The thermal system of claim 10, wherein the first inlet port is adapted to receive a connector that is coupled to an end of the first conduit to receive the flow of coolant and (ii) the one or more outlet ports including a plurality of ports each adapted to receive a connector that is coupled to one of the plurality of conduits.

16. A thermal system implemented within an electric vehicle including a plurality of battery packs, comprising:
    a first manifold including (i) a first inlet port configured to receive a flow of coolant supplied from a coolant source, and (ii) a plurality of outlet ports each adapted to output a flow of coolant via a conduit directed to a component within an electric vehicle for cooling the component, wherein the first inlet port is positioned on a first side region of the first manifold and has a diameter larger than a diameter of each of the one or more outlet ports; and a second manifold including (i) a plurality of inlet ports each configured to receive the flow of coolant from the component, and (ii) an outlet port configured to output an aggregate of the flows of coolant received by the plurality of inlet ports.

17. The thermal system of claim 16, wherein the first manifold further comprises a diagnostic port to receive a bleeder valve for removal of air present in conduits forming the flows of coolant within the thermal system.

18. The thermal system of claim 17, wherein the first manifold further comprises a first sensor port configured to receive and maintain a temperature sensor and a second sensor port configured to receive and maintain a pressure sensor.

\* \* \* \* \*